United States Patent
Lewis et al.

(10) Patent No.: US 10,370,555 B2
(45) Date of Patent: Aug. 6, 2019

(54) CURABLE FILM-FORMING COMPOSITIONS CONTAINING HYDROXYL FUNCTIONAL ACRYLIC POLYMERS AND BISUREA COMPOUNDS AND MULTILAYER COMPOSITE COATINGS

(71) Applicant: PPG INDUSTRIES OHIO, INC., Cleveland, OH (US)

(72) Inventors: Jason Ryan Lewis, Monaca, PA (US); Hongying Zhou, Allison Park, PA (US); Matthew S. Luchansky, Wexford, PA (US); Shanti Swarup, Allison Park, PA (US); John W. Burgman, Wexford, PA (US); Justin Jones, Cranberry Township, PA (US); Danielle Kirby, Wexford, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 105 days.

(21) Appl. No.: 15/596,127

(22) Filed: May 16, 2017

(65) Prior Publication Data

US 2018/0334584 A1   Nov. 22, 2018

(51) Int. Cl.

| C09D 133/06 | (2006.01) |
|---|---|
| C09D 7/00 | (2018.01) |
| C09D 7/12 | (2006.01) |
| B05D 7/00 | (2006.01) |
| C09D 7/65 | (2018.01) |
| C09D 7/44 | (2018.01) |
| C09J 133/06 | (2006.01) |

(52) U.S. Cl.
CPC ......... C09D 133/066 (2013.01); B05D 7/576 (2013.01); C09D 7/44 (2018.01); C09D 7/65 (2018.01); C09J 133/066 (2013.01)

(58) Field of Classification Search
CPC .. C09J 133/066; C08L 33/068; C08K 5/0025; B05D 7/576; C09D 1333/066; C09D 7/44; C09D 7/65; B32B 27/40
USPC .................. 428/423.1; 525/131; 528/48, 85; 427/372.2, 379, 385.5, 402
See application file for complete search history.

(56) References Cited

U.S. PATENT DOCUMENTS

| 4,286,048 A | 8/1981 | Merrill et al. |
|---|---|---|
| 4,522,958 A | 6/1985 | Das et al. |
| 4,546,046 A | 10/1985 | Etzell et al. |
| 4,960,828 A * | 10/1990 | Higuchi ............ C09D 133/066 525/162 |
| 5,212,273 A | 5/1993 | Das et al. |
| 5,849,835 A | 12/1998 | Das et al. |
| 5,965,670 A | 10/1999 | Mauer et al. |
| 5,977,256 A * | 11/1999 | Huybrechts ........ C08G 18/4063 524/507 |
| 5,980,993 A | 11/1999 | Mauer et al. |
| 6,111,001 A | 8/2000 | Barancyk et al. |
| 6,136,443 A | 10/2000 | Mauer et al. |
| 6,225,434 B1 | 5/2001 | Sadvary et al. |
| 6,685,985 B2 | 2/2004 | Boisseau et al. |
| 6,787,597 B1 | 9/2004 | Martin et al. |
| 6,803,413 B2 | 10/2004 | Martin et al. |
| 2004/0186242 A1 | 9/2004 | Bartlett et al. |
| 2006/0289828 A1 | 12/2006 | Brinkhuis et al. |
| 2007/0160851 A1 | 7/2007 | Barancyk et al. |
| 2010/0055467 A1* | 3/2010 | Kulfan ................ C08G 18/428 428/412 |
| 2011/0052822 A1* | 3/2011 | Chiga ................ C09D 133/066 427/407.1 |

FOREIGN PATENT DOCUMENTS

| EP | 0198519 B1 | 1/1990 |
|---|---|---|
| EP | 0767227 | 4/1997 |
| WO | 2018075631 | 4/2018 |

* cited by examiner

Primary Examiner — Thao T Tran
(74) Attorney, Agent, or Firm — Krisanne Shideler

(57) ABSTRACT

A curable film-forming composition is provided, comprising:
(a) an acrylic polyol prepared from a monomer mixture comprising a hydroxyl functional monomer, wherein the hydroxyl functional monomer comprises a hydroxyalkyl group with an alkyl chain of at least four carbon atoms;
(b) a rheology modifier comprising:
 (1) a non-aqueous dispersion of an internally cross-linked organic polymer; and
 (2) a reaction product of an amine and an isocyanate; and
(c) a curing agent comprising functional groups that are reactive with hydroxyl functional groups. Also provided are a multi-component composite coating that includes the curable film-forming composition described above and methods for forming a composite coating on a substrate.

16 Claims, No Drawings

CURABLE FILM-FORMING COMPOSITIONS CONTAINING HYDROXYL FUNCTIONAL ACRYLIC POLYMERS AND BISUREA COMPOUNDS AND MULTILAYER COMPOSITE COATINGS

FIELD OF THE INVENTION

The present invention relates to curable film-forming compositions that comprise hydroxyl functional acrylic polymers and rheology modifiers containing bisurea compounds. The present invention also relates to multi-layer composite coatings comprising the curable film-forming compositions and methods for forming a composite coating on a substrate.

BACKGROUND OF THE INVENTION

Color-plus-clear coating systems involving the application of a colored or pigmented basecoat to a substrate followed by the application of a transparent or clear topcoat to the basecoat are standard in the industry as original finishes for automobiles. The color-plus-clear systems have outstanding gloss and distinctness of image, and the clear topcoat is particularly important for these properties.

Often during application of the coatings to an automotive substrate, which is typically done by spraying, the appearance of a coating (such as its smoothness) is different when applied to a horizontally oriented substrate surface than when applied to a vertically oriented surface. This can result in noticeably different surface appearances in different areas of the same vehicle.

It would be desirable to provide a curable film-forming composition that demonstrates improved appearance properties over an entire substrate surface without loss of cured film properties such as acid etch resistance and UV durability.

SUMMARY OF THE INVENTION

The present invention provides a curable film-forming, or coating, composition comprising:
(a) an acrylic polyol prepared from a monomer mixture comprising a hydroxyl functional monomer, wherein the hydroxyl functional monomer comprises a hydroxyalkyl group with an alkyl chain of at least four carbon atoms;
(b) a rheology modifier comprising:
(1) a non-aqueous dispersion of an internally crosslinked organic polymer; and
(2) a reaction product of an amine and an isocyanate; and
(c) a curing agent comprising functional groups that are reactive with hydroxyl functional groups. Also provided is a multi-component composite coating comprising a first film-forming composition applied to a substrate to form a colored base coat, and a second, transparent film-forming composition applied on top of the base coat to form a clear top coat (clearcoat), wherein the transparent film-forming composition comprises the curable film-forming composition described above.

Additionally provided is a method for forming a composite coating on a substrate comprising:
(A) applying a first film-forming composition to at least a portion of a surface of the substrate to form a colored base coat;
(B) applying a second, transparent film-forming composition to at least a portion of the base coat formed in step (A) prior to substantially curing the first film-forming composition, to form a clear top coat thereon, wherein the transparent film-forming composition comprises the curable film-forming composition described above.

DETAILED DESCRIPTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Plural referents as used herein encompass singular and vice versa. For example, while the invention has been described in terms of "an" acrylic resin having epoxy functional groups, a plurality, including a mixture of such resins can be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of functional groups to give the equivalent weight. For example, urethane equivalent weight is based on the equivalents of urethane groups in the polyurethane material.

The curable film-forming compositions of the present invention are typically solventborne. As used herein, the terms "thermosetting" and "curable" can be used interchangeably and refer to resins that "set" irreversibly upon curing or crosslinking, wherein the polymer chains of the polymeric components are joined together by covalent bonds. This property is usually associated with a crosslinking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974).

Once cured or crosslinked, a thermosetting resin will not melt upon the application of heat and is insoluble in solvents.

The curable film-forming compositions of the present invention comprise (a) an acrylic polyol. The acrylic polyol comprises an addition polymer and may be prepared from a monomer mixture comprising a hydroxyl functional monomer. The hydroxyl functional monomer comprises a hydroxyalkyl group with an alkyl chain of at least four carbon atoms, such that the hydroxyl (—OH) group is remote from the acrylic polymer backbone after polymerization, separated by at least four carbon atoms (excluding any carbonyl carbon atoms, as in an acrylic monomer). For example, in a monomer mixture that includes hydroxybutyl methacrylate, the hydroxyl (—OH) group is remote from the acrylic polymer backbone after polymerization, separated by four carbon atoms in the butyl group. As used herein, the term "polymer" is meant to refer to polymers, prepolymers, and oligomers; the prefix "poly" refers to two or more.

Suitable acrylic polyols include copolymers of one or more alkyl esters of acrylic acid or methacrylic acid (i.e., (meth)acrylates, a term intended to include esters of acrylic acid or methacrylic acid), optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic polyol includes hydroxyl functional groups, which may be incorporated into the polymer by including one or more hydroxyl functional monomers in the reactants used to produce the copolymer. Useful hydroxyl functional monomers include hydroxyalkyl acrylates and methacrylates, typically having 2 to 12 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. In particular, as noted above, at least one hydroxyl functional monomer is included in the monomer mixture wherein the hydroxyl functional monomer comprises a hydroxyalkyl group with an alkyl chain of at least four carbon atoms, such that the hydroxyl functional group is removed from; i.e., situated remotely from, the acrylic polymer backbone by at least four carbon atoms. Examples of such monomers include 4-hydroxybutyl (meth)acrylate, 5-hydroxypentyl (meth)acrylate, 6-hydroxyhexyl (meth)acrylate, 8-hydroxyoctyl (meth)acrylate, 9-hydroxynonyl (meth)acrylate, 10-hydroxydecyl (meth)acrylate, 11-hydroxyundecyl (meth)acrylate, 12-hydroxydodecyl (meth)acrylate, and the like; 4-(hydroxymethyl)cyclohexyl)methyl (meth)acrylate; and hydroxy functional adducts of caprolactone. The hydroxyl functional monomer comprising a hydroxyalkyl group with an alkyl chain of at least four carbon atoms is typically present in the monomer mixture in an amount of at least 5 percent by weight, such as at least 12 percent by weight, or at least 15 percent by weight, and at most 25 percent by weight, or 22 percent by weight, or 20 percent by weight, based on the total weight of monomers in the monomer mixture. A typical range is 18 to 20 percent by weight.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. (Note: these epoxy functional monomers may also be used to prepare epoxy functional acrylic polymers.) Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

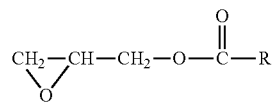

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

The acrylic polyol may also comprise terminal and/or pendant carbamate groups of the structure:

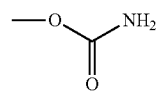

Carbamate functional groups can be incorporated into the acrylic polyol by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

In certain examples of the present invention, at least a portion of the acrylic polyol (a), which may or may not also comprise carbamate functional groups as described above, is further reacted with a lactide prior to incorporation into the curable film-forming composition. In this reaction, hydroxyl functional groups on the acrylic polyol react with the lactide by a ring-opening reaction, yielding a branch with multiple ester linkages and a terminal hydroxyl functional group. This lactide reaction may be performed before or after incorporation of the acrylic polyol into the curable film-forming composition, but it is typically performed prior to incorporation into the curable film-forming composition. In general, a lactide is the cyclic diester, i.e., the di-lactone of two molecules of any 2-hydroxycarboxylic acid, but the term "lactide" usually specifically refers to the cyclic di-ester of lactic acid (2-hydroxypropionic acid). An example of another suitable lactide is the cyclic di-ester of glycolic acid (2-hydroxyacetic acid). Up to 100% of the hydroxyl groups on the acrylic polyol (a) may be reacted with a lactide. The acrylic polyol (a) may comprise a mixture of lactide-modified and non-modified acrylic polyol; i.e., a mixture of the acrylic polyol (a) that has not been reacted with a lactide and acrylic polyol (a) that has been at least partially reacted with a lactide.

Acrylic polymers can be prepared via organic solution polymerization techniques and used directly in the preparation of solventborne coating compositions. Generally any method of producing such polymers that is known to those skilled in the art utilizing art recognized amounts of monomers can be used.

The acrylic polyol (a) demonstrates a weight average molecular weight of at least 3000, such as at least 5000, or at least 5500, and at most 10,000, or at most 7000, or at most 6500. Weight average and number average molecular weights as reported herein may be determined by gel permeation chromatography (GPC) using appropriate standards, in many cases polystyrene or sulfonated polystyrene.

Surface waviness is an indication of the roughness of a surface, and may be measured using a wave scan instrument such as the BYK Wavescan Plus available from BYK Gardner USA, which measures surface topography via an optical profile. The wave scan instrument uses a point source (i.e. laser) to illuminate the surface over a predetermined distance, for example 10 centimeters, at an angle of incidence of 60°. The reflected light is 30 measured at the same, but opposite angle. As the light beam hits a "peak" or "valley" of the surface, a maximum signal is detected; when the beam hits a "slope" of a peak/valley a minimum signal is registered. The measured signal frequency is equal to double spatial frequency of the coating surface topography. The surface "waviness" is differentiated into longterm and shortterm waviness ("longwave" and "shortwave") to simulate visual evaluation by the human eye. Data are divided into longwave (structure size >0.6 mm) and shortwave (structure size <0.6 mm) signals using a mathematical filter function. Each range in value from 0 to 50. Longterm waviness represents the variance of the longwave signal amplitude, while the shortterm waviness represents variance of the shortwave signal amplitude. The long- and shortterm waviness of a coating surface can give an indirect measure of topography-influencing factors such as substrate roughness, and flow and leveling properties of coatings. Longwave values may be determined using a BYK Wavescan Plus instrument in accordance with the manufacturer's suggested method of operation. Longwave values of lesser magnitude are indicative of coatings that are smoother in appearance.

The acrylic polyol (a) typically demonstrates a Fox glass transition temperature less than 15° C., often less than 10° C. Fox $T_g$ can be calculated according to T. G. Fox, *Bull. Am. Phys. Soc.* (Ser. II) 1, 123 (1956) and J. Brandrup, E. H. Immergut, *Polymer Handbook* 3rd edition, John Wiley, New York, 1989.

The amount of the acrylic polyol (a) in the curable film-forming composition generally ranges from 20 to 95 percent by weight based on the total weight of resin solids in the curable film-forming composition. For example, the minimum amount of polymeric binder may be at least 25 percent by weight, often at least 30 percent by weight and more often, at least 40 percent by weight. The maximum amount of polymeric binder may be 95 percent by weight, more often 85 percent by weight, or 75 percent by weight. Ranges of polymeric binder may include, for example, 25 to 90 percent by weight, 25 to 80 percent by weight, 30 to 70 percent by weight, 30 to 60 percent by weight, and 30 to 50 percent by weight.

As used herein, the phrase "based on the total weight of resin solids" or "based on the total weight of organic binder solids" (used interchangeably) of the composition means that the amount of the component added during the formation of the composition is based upon the total weight of the resin solids (non-volatiles) of the film forming materials, including cross-linkers and polymers present during the formation of the composition, but not including any water, solvent, or any additive solids such as hindered amine stabilizers, photoinitiators, pigments including extender pigments and fillers, flow modifiers, catalysts, and UV light absorbers.

The curable film-forming compositions of the present invention further comprise (b) a rheology modifier comprising two components:

(1) a non-aqueous dispersion of an internally crosslinked organic polymer; and (2) a reaction product of an amine and an isocyanate.

The internally crosslinked organic polymer in the non-aqueous dispersion (1) is typically an acrylic polymer and may be prepared from a monomer mixture comprising at least one monomer having functional groups that allow for crosslinking with itself and potentially with adjacent polymers, allowing for the formation of a gel, such as a microgel. Particle size may be determined from among the numerous techniques known in the art, such as the method described below. The particle size is measured with a Malvern Zetasizer, which is a high performance two angle particle size analyzer for the enhanced detection of aggregates and measurement of small or dilute samples, and samples at very low or high concentration using dynamic light scattering. Typical applications of dynamic light scattering are the characterization of particles, emulsions or molecules, which have been dispersed or dissolved in a liquid. The Brownian motion of particles or molecules in suspension causes laser light to be scattered at different intensities. Analysis of these intensity fluctuations yields the velocity of the Brownian motion and hence the particle size using the Stokes-Einstein relationship. The reported particle sizes for all examples are the Z average mean value.

For example, any monomer known in the art which contains at least two ethylenically unsaturated double bonds may be included in the monomer mixture. Suitable monomers include, without limitation, di(meth)acrylates (e.g., hexanediol di(meth)acrylate), ethylene glycol di(meth)acrylate, butanediol di(meth)acrylate, decandediol di(meth)acrylate, or a combination of di(meth)acrylates. An exemplary internally crosslinked organic polymer may be prepared as described in the Examples below, from a monomer mixture comprising:
  (i) methyl methacrylate;
  (ii) butyl acrylate;
  (iii) styrene; and
  (iv) ethylene glycol dimethacrylate.

The internally crosslinked organic polymer may be dispersed in an organic continuous phase comprising an organic solvent or polymer using high stress mixing or homogenization to form the non-aqueous dispersion (1). Suitable non-aqueous media for use as the organic continuous phase include ketones such as methyl amyl ketone, and glycol ethers such as 2-butoxyethanol.

The use of the non-aqueous dispersion of the internally crosslinked organic polymer improves the "hold-out" between coating layers when the curable film-forming composition of the present invention is used in a multicomponent composite coating. As used herein, the term hold-out refers to preventing or minimizing significant mixing between a first applied uncured coating composition and the subsequently applied uncured coating composition(s), i.e., the layers remain largely separate and distinct. Thus, the present invention allows for maintenance of separate and distinct layers in a wet-on-wet, or wet-on-wet-on-wet, application. A coating system that does not have good hold-out between the layers may have poor appearance, such as "mud-cracking", which is evidenced by small cracks or fissures on the surface of the coating, or by consistency of shortwave appearance over a range of processing conditions.

The non-aqueous dispersions of internally crosslinked organic polymer used in the present invention provide several advantages over fumed silica dispersions, which are conventionally used as rheology control agents. Rheology control agents are primarily utilized in coating compositions to modify flow behavior, usually for the restriction of flow to improve resistance to sag. Conventional rheology control agents can include fumed silica, which has numerous drawbacks. Typically, fumed silica is introduced into a formulation as a dispersion. Extensive processing is required in order to produce the fumed silica dispersion as an intermediate, prior to incorporation into the formulation. This dispersion will include a resin grind vehicle, which can crosslink into the binder system while the fumed silica particles themselves typically will not. The resin grind vehicle can become a significant portion of the binder; this may be detrimental for appearance properties due to limiting formulation latitude for other binder resins. Fumed silica particles also contribute haze to a clear coating due to light scattering, adversely affecting color appearance properties. Usually the curable film-forming compositions of the present invention are essentially free of fumed silica. By "essentially free" of a material is meant that a composition has only trace or incidental amounts of a given material, and that the material is not present in an amount sufficient to affect any properties of the composition. These materials are not essential to the composition and hence the composition is free of these materials in any appreciable or essential amount. If they are present, it is in incidental amounts only, typically less than 0.1 percent by weight, based on the total weight of solids in the composition.

The non-aqueous dispersions used in the present invention do not include additional resin grind vehicle as does a fumed silica dispersion. The internally crosslinked organic polymer can contain reactive functional groups to crosslink into the binder system and is usually a small portion of the total binder system, which allows improved formulation latitude over a fumed silica dispersion. The non-aqueous dispersions produce minimal light scattering, if any at all, so color appearance properties are not adversely affected.

The rheology modifier (b) further comprises (2) a reaction product of an amine and an isocyanate, usually in the form of a bisurea. The bisurea may be crystalline. Suitable isocyanates include polyisocyanates. The polyisocyanate can be aliphatic, aromatic, or a mixture thereof. Although higher polyisocyanates such as isocyanurates of diisocyanates are often used, diisocyanates are more often used. Isocyanate prepolymers, for example reaction products of polyisocyanates with polyols also can be used. Mixtures of polyisocyanates can be used.

The polyisocyanate can be prepared from a variety of isocyanate-containing materials. Examples of suitable polyisocyanates include the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. Trimers prepared from one or more of these diisocyanates may also be used.

Suitable amines used to prepare the reaction product (2) may be primary or secondary monoamines or mixtures thereof. The amines may be aromatic or aliphatic (e.g., cycloaliphatic). Non-limiting examples of suitable monoamines can include aliphatic polyamines such as ethylamine, isomeric propylamines, butylamines, pentylamines, hexylamines, cyclohexylamine, and benzylamine. In a particular example of the present invention, the reaction product (2) comprises hexamethylene diisocyanate at least partially capped with benzylamine.

The reaction product (2) may be added to the curable film-forming composition neat, or may be dispersed in a carrier vehicle such as an acrylic polyol prepared from a monomer mixture comprising:
  (i) 35 to 40 percent by weight of a beta-hydroxy ester functional monomer such as any of those described above, prepared from an ethylenically unsaturated acid functional monomer and an epoxy compound containing at least 5 carbon atoms;
  (ii) 15 to 20 percent by weight of hydroxyethyl methacrylate;
  (iii) 25 to 30 percent by weight of styrene; and
  (iv) 10 to 15 percent by weight of 2-ethylhexyl acrylate, wherein the amounts are based on the total weight of monomers in the monomer mixture. When the reaction product (2) is dispersed in a carrier vehicle, it is typically present in the dispersion in an amount of 2 to 5 percent by weight, based on the total weight of the dispersion. The reaction product (2) is usually present in the curable film-forming composition in an amount of 0.1 to 2.0 percent by weight, such as 0.3 to 0.7 percent by weight, often 0.65 percent by weight, based on the total weight of resin solids in the curable film-forming composition. The dispersion of the reaction product (2) in the carrier vehicle is typically present in the curable film-forming composition in an amount of 10 to 20 percent by weight, often 15 percent by weight, based on the total weight of resin solids in the curable film-forming composition.

The curable film-forming compositions of the present invention further comprise (c) a curing (crosslinking) agent containing functional groups that are reactive with the hydroxyl functional groups of (a). Such curing agents typically comprise one or more aminoplasts, polyisocyanates, including blocked isocyanates, and mixtures of any of the foregoing, and include those known in the art for any of these materials.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL®, and from INEOS Melamines under the trademark RESIMENE®. The curing agent (c) often comprises an aminoplast that is at least 80% alkylated. Suitable commercial aminoplasts include RESIMENE 745, 747, 757, and 797, available from INEOS Melamines, and CYMEL 301, 303, AND 1131, available from Cytec Industries, Inc.

Other curing agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

The amount of the curing agent (c) in the curable film-forming composition generally ranges from 5 to 75 percent by weight based on the total weight of resin solids in the curable film-forming composition. For example, the minimum amount of curing agent may be at least 5 percent by weight, often at least 10 percent by weight and more often, at least 15 percent by weight. The maximum amount of curing agent may be 75 percent by weight, more often 60 percent by weight, or 50 percent by weight. Ranges of curing agent may include, for example, 5 to 50 percent by weight, 5 to 60 percent by weight, 10 to 50 percent by weight, 10 to 60 percent by weight, 10 to 75 percent by weight, 15 to 50 percent by weight, 15 to 60 percent by weight, 15 to 75 percent by weight, and 25 to 50 percent by weight.

The curable film-forming composition of the present invention may further comprise additional polymeric resins, usually carbamate functional resins such as one or more carbamate functional polyester polyols.

Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

An exemplary polyester polyol may be prepared from a reaction mixture comprising 2,2,4-trimethyl-1,3-pentanediol, trimethylolpropane, neopentyl glycol, and hexahydrophthalic anhydride in a 22.7:10.6:17.5:49.2 weight ratio.

Carbamate functional groups may be incorporated into the polyester by first forming a hydroxyalkyl carbamate which can be reacted with the polyacids and polyols used in forming the polyester. The hydroxyalkyl carbamate is condensed with acid functionality on the polymer, yielding terminal carbamate functionality. Carbamate functional groups may also be incorporated into the polyester by reacting a portion of terminal hydroxyl groups on the polyester with a low molecular weight carbamate functional material via a transcarbamoylation process, or by reacting isocyanic acid with a hydroxyl functional polyester. In a transcarbamoylation reaction, a low molecular weight carbamate functional material derived from an alcohol or glycol ether is reacted with the hydroxyl groups of the polyester polyol, yielding a carbamate functional polyester polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

When used, the carbamate functional resin is present in the curable film-forming composition in an amount of at least 15 percent by weight, or at least 20 percent by weight, and at most 30 percent by weight, based on the total weight of resin solids in the curable film-forming composition. An exemplary amount is 25 percent by weight.

The curable film-forming composition of the present invention may additionally include other optional ingredients commonly used in such compositions. For example, the composition may further comprise a hindered amine light stabilizer for UV degradation resistance. Such hindered amine light stabilizers include those disclosed in U.S. Pat. No. 5,260,135. When they are used they are present in the composition in an amount of 0.1 to 2 percent by weight, based on the total weight of resin solids in the film-forming composition. Other optional additives may be included such as colorants, plasticizers, abrasion-resistant particles, film strengthening particles, fillers, catalysts such as dodecylbenzene sulfonic acid blocked with diisopropanolamine, antioxidants, biocides, defoamers, surfactants, wetting agents, dispersing aids, adhesion promoters, UV light absorbers and stabilizers, a stabilizing agent, organic cosolvents, reactive diluents, grind vehicles, and other customary auxiliaries, or combinations thereof.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discrete "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. Special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

As used herein, the terms "adhesion promoter" and "adhesion promoting component" refer to any material that, when included in the composition, enhances the adhesion of the coating composition to a metal substrate. Such an adhesion promoting component often comprises a free acid. As used herein, the term "free acid" is meant to encompass organic and/or inorganic acids that are included as a separate component of the compositions as opposed to any acids that may be used to form a polymer that may be present in the composition. The free acid may comprise tannic acid, gallic acid, phosphoric acid, phosphorous acid, citric acid, malonic acid, a derivative thereof, or a mixture thereof. Suitable derivatives include esters, amides, and/or metal complexes of such acids. Often, the free acid comprises a phosphoric acid, such as a 100 percent orthophosphoric acid, superphosphoric acid or the aqueous solutions thereof, such as a 70 to 90 percent phosphoric acid solution.

In addition to or in lieu of such free acids, other suitable adhesion promoting components are metal phosphates, organophosphates, and organophosphonates. Suitable organophosphates and organophosphonates include those disclosed in U.S. Pat. No. 6,440,580 at column 3, line 24 to column 6, line 22, U.S. Pat. No. 5,294,265 at column 1, line 53 to column 2, line 55, and U.S. Pat. No. 5,306,526 at column 2, line 15 to column 3, line 8, the cited portions of which are incorporated herein by reference. Suitable metal phosphates include, for example, zinc phosphate, iron phosphate, manganese phosphate, calcium phosphate, magnesium phosphate, cobalt phosphate, zinc-iron phosphate, zinc-manganese phosphate, zinc-calcium phosphate, including the materials described in U.S. Pat. Nos. 4,941,930, 5,238,506, and 5,653,790. As noted above, in certain situations, phosphates are excluded.

The adhesion promoting component may comprise a phosphatized epoxy resin. Such resins may comprise the reaction product of one or more epoxy-functional materials and one or more phosphorus-containing materials. Non-limiting examples of such materials, which are suitable for use in the present invention, are disclosed in U.S. Pat. No. 6,159,549 at column 3, lines 19 to 62, the cited portion of which is incorporated by reference herein.

The curable film-forming composition of the present invention may also comprise alkoxysilane adhesion promoting agents, for example, acryloxyalkoxysilanes, such as γ-acryloxypropyltrimethoxysilane and methacrylatoalkoxysilane, such as γ-methacryloxypropyltrimethoxysilane, as well as epoxy-functional silanes, such as γ-glycidoxypropyltrimethoxysilane. Exemplary suitable alkoxysilanes are described in U.S. Pat. No. 6,774,168 at column 2, lines 23 to 65, the cited portion of which is incorporated by reference herein. Siloxane borates, such as those described in the examples below, are also suitable.

The adhesion promoting component is usually present in the coating composition in an amount ranging from 0.05 to 20 percent by weight, such as at least 0.05 percent by weight or at least 0.25 percent by weight, and at most 20 percent by weight or at most 15 percent by weight, with ranges such as 0.05 to 15 percent by weight, 0.25 to 15 percent by weight, or 0.25 to 20 percent by weight, with the percentages by weight being based on the total weight of resin solids in the composition.

The curable film-forming compositions of the present invention may be formulated to a resin solids content of at least 52 percent by weight, such as at least 57 percent by weight, based on the total weight of resin solids in the curable film-forming composition. An exemplary composition has a solids content of 57 to 59 percent, as measured using a Mettler-Toledo HX204 Moisture Analyzer at 140° C.

The curable film-forming compositions of the present invention may be applied to a substrate surface and cured to form a coating layer as described below. Upon curing of the curable film-forming composition to form a cured composition, the cured composition demonstrates a crosslink density of up to 20 mmol/cc, as measured using dynamic mechanical analysis.

Substrates to which compositions of the present invention may be applied include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The substrate may alternatively comprise a polymer or a composite material such as a fiberglass composite. Car parts typically formed from thermoplastic and thermoset materials include bumpers and trim.

Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with an appropriate solution known in the art, such as a metal phosphate solution, an aqueous solution containing at least one Group IIIB or IVB metal, an organophosphate solution, an organophosphonate solution, and combinations thereof, as discussed below. Examples of aluminum alloys include those alloys used in the automotive or aerospace industry, such as 2000, 6000, or 7000 series aluminums; 2024, 7075, 6061 are particular examples. Alloys may be unclad or they may contain a clad layer on one or more surfaces, the clad layer consisting of a different aluminum alloy than the base/bulk alloy beneath the clad layer.

The substrate may alternatively comprise more than one metal or metal alloy in that the substrate may be a combination of two or more metal substrates assembled together such as hot-dipped galvanized steel assembled with aluminum substrates. The substrate may comprise part of a vehicle. "Vehicle" is used herein in its broadest sense and includes all types of vehicles, such as but not limited to airplanes, helicopters, cars, trucks, buses, vans, golf carts, motorcycles, bicycles, railroad cars, tanks and the like. It will be appreciated that the portion of the vehicle that is coated according to the present invention may vary depending on why the coating is being used.

The shape of the metal substrate can be in the form of a sheet, plate, bar, rod or any shape desired, but it is usually in the form of an automobile part, such as a body, door, fender, hood or bumper. The thickness of the substrate can vary as desired.

The curable film-forming composition may be applied directly to the metal substrate when there is no intermediate coating between the substrate and the curable film-forming composition. By this is meant that the substrate may be bare, as described below, or may be treated with one or more pretreatment compositions as described below, but the substrate is not coated with any coating compositions such as an electrodepositable composition or a primer composition prior to application of the curable film-forming composition of the present invention.

As noted above, the substrates to be used may be bare metal substrates. By "bare" is meant a virgin metal substrate that has not been treated with any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

The substrate may optionally be cleaned using conventional cleaning procedures and materials. These would include mild or strong alkaline cleaners such as are commercially available and conventionally used in metal pretreatment processes. Examples of alkaline cleaners include Chemkleen 163 and Chemkleen 177, both of which are available from PPG Industries, Pretreatment and Specialty Products. Such cleaners are generally followed and/or preceded by a water rinse. The metal surface may also be rinsed with an aqueous acidic solution after or in place of cleaning with the alkaline cleaner. Examples of rinse solutions include mild or strong acidic cleaners such as the dilute nitric acid solutions commercially available and conventionally used in metal pretreatment processes.

According to the present invention, at least a portion of a cleaned aluminum substrate surface may be deoxidized, mechanically or chemically. As used herein, the term "deoxidize" means removal of the oxide layer found on the surface of the substrate in order to promote uniform deposition of the pretreatment composition (described below), as well as to promote the adhesion of the pretreatment composition coating to the substrate surface. Suitable deoxidizers will be familiar to those skilled in the art. A typical mechanical deoxidizer may be uniform roughening of the substrate surface, such as by using a scouring or cleaning pad. Typical chemical deoxidizers include, for example, acid-based deoxidizers such as phosphoric acid, nitric acid, fluoroboric acid, sulfuric acid, chromic acid, hydrofluoric acid, and ammonium bifluoride, or Amchem 7/17 deoxidizers (available from Henkel Technologies, Madison Heights, Mich.), OAKITE DEOXIDIZER LNC (commercially available from Chemetall), TURCO DEOXIDIZER 6 (commercially available from Henkel), or combinations thereof. Often, the chemical deoxidizer comprises a carrier, often an aqueous medium, so that the deoxidizer may be in the form of a solution or dispersion in the carrier, in which case the solution or dispersion may be brought into contact with the substrate by any of a variety of known techniques, such as dipping or immersion, spraying, intermittent spraying, dipping followed by spraying, spraying followed by dipping, brushing, or roll-coating.

A metal substrate may optionally be pretreated with any suitable solution known in the art, such as a metal phosphate solution, an aqueous solution containing at least one Group IIIB or IVB metal, an organophosphate solution, an organophosphonate solution, and combinations thereof. The pretreatment solutions may be essentially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc-calcium phosphate, and layers of other types, which may contain one or more multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the *Handbook of Chemistry and Physics,* 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of a yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL®.

In the aerospace industry, anodized surface treatments as well as chromium based conversion coatings/pretreatments are often used on aluminum alloy substrates. Examples of anodized surface treatments would be chromic acid anodizing, phosphoric acid anodizing, boric acid-sulfuric acid anodizing, tartaric acid anodizing, sulfuric acid anodizing. Chromium based conversion coatings would include hexavalent chromium types, such as Bonderite® M-CR1200 from Henkel, and trivalent chromium types, such as Bonderite® M-CR T5900 from Henkel.

The curable film-forming composition of the present invention may be applied to the substrate using conventional techniques including dipping or immersion, spraying, intermittent spraying, dipping followed by spraying, spraying followed by dipping, brushing, or roll-coating.

The coating compositions of the present invention may be used alone as a protective layer or may serve as a unicoat, or monocoat, layer. Alternatively, the compositions of the present invention may be in combination as primers, basecoats, and/or topcoats. Thus the present invention provides for a multi-component composite coating comprising a first film-forming composition applied to a substrate to form a colored base coat, and a second, transparent film-forming composition applied on top of the base coat to form a clear top coat, wherein the transparent film-forming composition comprises the curable film-forming composition of the present invention as described above. The term "transparent", as used for example in connection with a substrate, film, material and/or coating, means that the indicated substrate, coating, film and/or material is optically clear and has the property of transmitting light without appreciable scattering so that objects lying beyond are entirely visible.

Suitable base coats include any of those known in the art, and may be waterborne, solventborne or powdered. The base coat typically includes a film-forming resin, crosslinking material and pigment. Non-limiting examples of suitable base coat compositions include waterborne base coats such as are disclosed in U.S. Pat. Nos. 4,403,003; 4,147,679; and 5,071,904.

After application of each composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 70 to 250° F. (27 to 121° C.) will be sufficient. More than one coating layer of the present composition may be applied if desired. Usually between coats, the previously applied coat is flashed; that is, exposed to ambient conditions for the desired amount of time. Ambient temperature typically ranges from 60 to 90° F. (15.6 to 32.2° C.), such as a typical room temperature, 72° F. (22.2° C.).

The thickness of the coating is usually from 0.1 to 3 mils (2.5 to 75 microns), such as 0.2 to 2.0 mils (5.0 to 50 microns). The coating composition may then be heated. In the curing operation, solvents are driven off and crosslinkable components of the composition are crosslinked. The heating and curing operation is sometimes carried out at a temperature in the range of from 70 to 250° F. (27 to 121° C.) but, if needed, lower or higher temperatures may be used. As noted previously, the coatings of the present invention may also cure without the addition of heat or a drying step. Additionally, the first coating composition may be applied and then the second applied thereto "wet-on-wet", or at least one base coat may be applied on top of a primer before the primer is cured, followed by application of a clear coat to the base coat(s) before the base coat(s) is cured; i.e., "wet-on-wet-on-wet" or "3-wet", and the entire multi-layer coating stack cured simultaneously in a compact process (also known as 3C1B). Alternatively, each coating composition can be cured before application of the next coating composition.

The present invention further provides a method for forming a composite coating on a substrate comprising:

(A) applying a first film-forming composition to at least a portion of a surface of the substrate to form a colored base coat; and (B) applying a second, transparent film-forming composition to at least a portion of the base coat formed in step (A) prior to substantially curing the first film-forming composition, to form a clear top coat thereon, wherein the transparent film-forming composition comprises the curable film-forming composition described above.

In the method of the present invention, a primer may be applied to the substrate to form a primer coating upon the surface of the substrate prior to applying the first film-forming composition of step (A), and then the first film-forming composition may be applied directly onto the primer coating. Again, the primer coating may be cured prior to application of the first film-forming composition in step (A), or at least one base coat may be applied on top of a primer before the primer is cured, followed by application of a clear coat to the base coat(s) before the base coat(s) is cured in a "wet-on-wet-on-wet" process, and then the entire multi-layer coating stack may be cured simultaneously in a compact process. The method of the present invention may further comprise (C) holding the coated substrate at a temperature and for a time sufficient to substantially cure the composite coating after all coating compositions have been applied to the substrate. Application and curing methods and conditions may be as described above.

Each of the characteristics and examples described above, and combinations thereof, may be said to be encompassed by the present invention. The present invention is thus drawn to the following nonlimiting aspects: in a first aspect, a curable film-forming composition is provided by the present invention, comprising: (a) an acrylic polyol prepared from a monomer mixture comprising a hydroxyl functional monomer, wherein the hydroxyl functional monomer comprises a hydroxyalkyl group with an alkyl chain of at least four carbon atoms; (b) a rheology modifier comprising: (1) a non-aqueous dispersion of an internally crosslinked organic polymer; and (2) a reaction product of an amine and an isocyanate; and (c) a curing agent comprising functional groups that are reactive with hydroxyl functional groups.

In a second aspect, in the composition according to the first aspect described above, the acrylic polyol demonstrates a weight average molecular weight of 3000 to 10,000.

In a third aspect, in any of the compositions according to either of the first or second aspect described above, the acrylic polyol demonstrates a glass transition temperature less than 15° C.

In a fourth aspect, in any of the compositions according to any of the first to third aspects described above, the hydroxyl functional monomer comprising a hydroxyalkyl group with an alkyl chain of at least four carbon atoms is present in the monomer mixture in an amount of 5 to 25 percent by weight, based on the total weight of monomers in the monomer mixture.

In a fifth aspect, in any of the compositions according to any aspect described above, the internally crosslinked organic polymer is prepared from a monomer mixture comprising: (i) methyl methacrylate; (ii) butyl acrylate; (iii) styrene; and (iv) ethylene glycol dimethacrylate.

In a sixth aspect, in any of the compositions according to any aspect described above, the reaction product (2) comprises hexamethylene diisocyanate at least partially capped with benzylamine.

In a seventh aspect, in the composition according to any aspect described above, the reaction product (2) is dispersed in a second acrylic polyol prepared from a monomer mixture comprising: (i) a beta-hydroxy ester functional monomer prepared from an ethylenically unsaturated acid functional monomer and an epoxy compound containing at least 5 carbon atoms; (ii) hydroxyethyl methacrylate; (iii) styrene; and (iv) 2-ethylhexyl acrylate.

In an eighth aspect, in any of the compositions according to any aspect described above, curing agent (c) comprises an aminoplast that is at least 80% alkylated.

In an ninth aspect, in any of the compositions according to any aspect described above, at least a portion of the acrylic polyol (a) is further reacted with a lactide prior to incorporation into the curable film-forming composition.

In a tenth aspect, in any of the compositions according to any aspect described above, at least a portion of the acrylic polyol (a) further comprises carbamate functional groups.

In an eleventh aspect, in any of the compositions according to any aspect described above, the curable film-forming composition further comprises a carbamate functional polyester polyol.

In an twelfth aspect, in the composition according to the eleventh aspect described above, the polyester polyol is prepared from a reaction mixture comprising: (i) hexahydrophthalic anhydride; (ii) 2-ethyl-2-hydroxymethyl-1,3-propanediol; (iii) trimethylpentanediol; and (iv) dimethylpropanediol.

In a thirteenth aspect, in any of the compositions according to any aspect described above, the composition has a resin solids content of at least 52 percent by weight, based on the total weight of resin solids in the curable film-forming composition.

In a fourteenth aspect, a multi-component composite coating is provided comprising a first film-forming composition applied to a substrate to form a colored base coat, and a second, transparent film-forming composition applied on top of the base coat to form a clear top coat, wherein the transparent film-forming composition comprises any of the compositions according to any of the aspects above.

In a fifteenth aspect, in the multi-component composite coating according to the fourteenth aspect described above, the multi-component composite coating further comprises a primer composition applied to the substrate prior to application of the first film-forming composition.

In a sixteenth aspect, a method for forming a composite coating on a substrate is provided comprising: (A) applying a first film-forming composition to at least a portion of a surface of the substrate to form a colored base coat; and (B) applying a second, transparent film-forming composition to at least a portion of the base coat formed in step (A) prior to substantially curing the first film-forming composition, to form a clear top coat thereon, wherein the transparent film-forming composition comprises any of the compositions according to any of the first through thirteenth aspects above.

In a seventeenth aspect, in the method according to the sixteenth aspect described above, the method further comprises a step of forming a primer coating upon the surface of the substrate prior to applying the first film-forming composition of step (A), wherein the first coating composition is applied directly onto the primer coating.

In an eighteenth aspect, in the method according to the seventeenth aspect described above, the primer coating is cured prior to applying the first coating composition of step (A).

In a nineteenth aspect, in any of the methods according to the sixteenth to eighteenth aspects above, the method further comprises (C) holding the substrate at a temperature and for a time sufficient to substantially cure the composite coating after all coating compositions have been applied to the substrate.

The invention will be further described by reference to the following examples. Unless otherwise indicated, all parts are by weight.

EXAMPLE A

A non-aqueous dispersion (NAD) of an internally cross-linked acrylic polymer was prepared as described in Example 1 in the U.S. Pat. No. 5,212,273, with the following modifications: Charge 10 was replaced with an equal amount of a 70/30 wt % blend of amyl propionate and ethylene glycol monobutyl ether.

EXAMPLE B

A bisurea crystal was prepared as described below:

|  | Ingredients | Parts by weight |
|---|---|---|
| Charge 1: | OH functional Acrylic Resin[1] | 320 |
|  | Aromatic 100 | 18.4 |
|  | Xylene | 9.42 |
|  | Benzylamine | 5.12 |
|  | Propylene glycol | 10.73 |
| Charge 2: | 1,6 Hexamethylene diisocyanate | 4.02 |
|  | Aromatic 100 | 11.15 |
|  | Xylene | 5.88 |

[1]Acrylic resin comprising 28.65 wt % CARDURA E (available from Hexion, Inc.), 30.0 wt % Styrene, 19.9 wt % Hydroxymethyl methacrylate, 13.19 wt % 2-Ethtylhexyl acrylate, and 8.26 wt % Acrylic Acid; with a Mn of 2697, Mw of 7709 and Viscosity of Z1 at 65.3% solids in 66:33 AROMATIC 100 (available from ExxonMobil):Xylene.

Charge 1 was charged to an open cylindrical flask equipped with a pitch blade agitator. The agitator was set to 750 rpm and the reaction mixture was heated to 25° C. Charge 2 was then added to the reaction mixture over 20 minutes then stirred for 80 minutes. The resultant product was a dispersion of rheology modifier particles in acrylic resin which had a theory solids of 56.41 percent and a Brookfield viscosity (#6 spindle) of 9000 cps at 5 rpm and 2000 cps at 100 rpm.

EXAMPLE C

An acrylic polyol was prepared with the following ingredients:

| Charge | Ingredients | Parts by weight |
|---|---|---|
| #1 | methyl amyl ketone | 449.8 |
| #2 | di-t-amyl peroxide | 100.00 |
|  | methyl amyl ketone | 240.0 |
| #3 | butyl methacrylate | 438.6 |
|  | styrene | 276.0 |
|  | Isobornyl methacrylate | 276.0 |
|  | hydroxypropyl acrylate | 150.0 |
|  | 4-hydroxybutyl acrylate | 150.0 |
|  | butyl acrylate | 358.4 |
|  | Tertiary dodecyl mercaptan | 12.0 |

-continued

| Charge | Ingredients | Parts by weight |
|---|---|---|
| #4 | butyl methacrylate | 154.6 |
| | hydroxypropyl acrylate | 50.0 |
| | 4-hydroxybutyl acrylate | 50.0 |
| | butyl acrylate | 96.4 |
| | methyl amyl ketone | 47.03 |
| #5 | di-t-amyl peroxide | 20.00 |
| | methyl amyl ketone | 13.55 |
| #6 | di-t-amyl peroxide | 20.00 |
| | methyl amyl ketone | 27.1 |
| #7 | methyl amyl ketone | 336.80 |

Charge 1 was added to a round bottom flask equipped with a stirrer, condenser, temperature control system, and two feeding lines under inert gas. The reaction mixture was heated to 150° C. with stirring. Charge 2 was mixed together and added into the reactor over 240 minutes. After 5 minutes, charge 3 was added into the reactor over 180 minutes. When addition of charge 3 was completed, charge 4 was added into the reaction mixture over 45 minutes. At the end of both additions, the reaction mixture was stirred an additional one hour at reflux. An additional spike (charge 5) of initiator was added to the reaction mixture over 30 minutes and stirring was continued for 1 hour at reflux. Another additional spike (charge 6) of initiator was added to the reaction mixture over 30 minutes and stirring was continued for 1 hour at reflux. Charge 7 was added into reaction mixture and the reaction mixture was cooled to 40° C. The solids of the acrylic polyol was measured at 64.1% and weight average molecular weight was 6,290 as determined by Gel Permeation Chromatography using Waters 2695 separation module with a Waters 410 differential refractometer (RI detector) and polystyrene standards. Tetrahydrofuran (THF) was used as the eluent at a flow rate of 1 ml min-1, and two PL Gel Mixed C columns were used for separation.

EXAMPLE D

A carbamate functional polyester was prepared as described in Example 3 in the U.S. Pat. No. 6,228,953.

EXAMPLE E

A siloxane borate polyol was prepared in two steps. In step 1: siloxane polyol was prepared as described in Example AA in the U.S. Pat. No. 6,534,188, except that the MASILWAX was purchased from Emrold Performance Materials. In step 2: the siloxane borate material was prepared as described in Example C in the U.S. Pat. No. 6,534,188, in a monomethyl ether of propylene glycol instead of isopropanol using siloxane polyol prepared in step 1.

EXAMPLE F

A lactide-modified acrylic polymer was prepared from the following ingredients:

| Ingredients | Parts by weight |
|---|---|
| Acrylic polyol of Example C | 3000.00 |
| Lactide | 400.79 |
| Butyl stannoic acid | 2.09 |
| Triphenyl phosphite | 2.09 |

Charge 1 was added to a round bottom flask equipped with a stirrer, condenser, temperature control system, under inert gas. The reaction mixture was gradually heated to 130° C. with stirring. The reaction mixture was maintained at 130° C. for at least 3 hours until the lactide peak was gone by infrared spectroscopy (looking for loss of lactide peak at 936 cm-1). The reaction mixture was cooled to 50° C. and poured into a suitable container.

EXAMPLE G

An NAD of an internally crosslinked acrylic polymer was prepared as described in Example 1 in the U.S. Pat. No. 5,212,273.

EXAMPLE H

An acrylic polyol comprising 20 percent by weight hydroxyethyl acrylate was prepared as described below:

| Charge | Ingredients | Parts by weight |
|---|---|---|
| #1 | Aromatic 100 | 495.00 |
| | Dowanol PM[1] | 67.15 |
| #2 | di-t-amyl peroxide | 30.00 |
| | Aromatic 100 | 270.00 |
| | Dowanol PM | 30.00 |
| #3 | butyl methacrylate | 530.00 |
| | Isobornyl methacrylate | 690.00 |
| | hydroxyethyl acrylate | 374.75 |
| | butyl acrylate | 467.50 |
| #4 | butyl methacrylate | 186.50 |
| | hydroxyethyl acrylate | 125.30 |
| | butyl acrylate | 126.00 |
| | Aromatic 100 | 58.79 |
| #5 | di-t-amyl peroxide | 25.00 |
| | Aromatic 100 | 16.93 |
| #6 | di-t-amyl peroxide | 25.00 |
| | Aromatic 100 | 16.88 |
| #7 | Aromatic 100 | 437.93 |

[1]Propylene Glycol Methyl Ether, available from the Dow Chemical Company

Charge 1 was added to a round bottom flask equipped with a stirrer, condenser, temperature control system, and two feeding lines under inert gas. The reaction mixture was heated to 150° C. with stirring. Charge 2 was mixed together and added into the reactor over 240 minutes. After 5 minutes, charge 3 was added into the reactor over 180 minutes. When addition of charge 3 was completed, charge 4 was added into the reaction mixture over 45 minutes. At the end of both additions, the reaction mixture was stirred an additional one hour at reflux. An additional spike (charge 5) of initiator was added to the reaction mixture over 30 minutes and stirring was continued for 1 hour at reflux. Another additional spike (charge 6) of initiator was added to the reaction mixture over 30 minutes and stirring was continued for 1 hour at reflux. Charge 7 was added into reaction mixture and the reaction mixture was cooled to 40° C. The solid content was 64.42% and weight average molecular weight was 6995, measured as in Example C.

EXAMPLE I

An acrylic polyol comprising 30 percent by weight hydroxyethyl acrylate was prepared as described below:

| Charge | Ingredients | Parts by weight |
|---|---|---|
| #1 | Aromatic 100 | 495.00 |
| | Dowanol PM | 67.15 |

-continued

| Charge | Ingredients | Parts by weight |
|---|---|---|
| #2 | di-t-amyl peroxide | 30.00 |
| | Aromatic 100 | 270.00 |
| | Dowanol PM | 30.00 |
| #3 | butyl methacrylate | 419.00 |
| | Isobornyl methacrylate | 690.00 |
| | hydroxyethyl acrylate | 562.00 |
| | butyl acrylate | 388.75 |
| #4 | butyl methacrylate | 147.5 |
| | hydroxyethyl acrylate | 188.00 |
| | butyl acrylate | 104.75 |
| | Aromatic 100 | 58.79 |
| #5 | di-t-amyl peroxide | 25.00 |
| | Aromatic 100 | 16.93 |
| #6 | di-t-amyl peroxide | 25.00 |
| | Aromatic 100 | 16.88 |
| #7 | Aromatic 100 | 437.93 |

Charge 1 was added to a round bottom flask equipped with a stirrer, condenser, temperature control system, and two feeding lines under inert gas. The reaction mixture was heated to 150° C. with stirring. Charge 2 was mixed together and added into the reactor over 240 minutes. After 5 minutes, charge 3 was added into the reactor over 180 minutes. When addition of charge 3 was completed, charge 4 was added into the reaction mixture over 45 minutes. At the end of both additions, the reaction mixture was stirred an additional one hour at reflux. An additional spike (charge 5) of initiator was added to the reaction mixture over 30 minutes and stirring was continued for 1 hour at reflux. Another additional spike (charge 6) of initiator was added to the reaction mixture over 30 minutes and stirring was continued for 1 hour at reflux. Charge 7 was added into reaction mixture and the reaction mixture was cooled to 40° C. The solid content was 66.13% and weight average molecular weight was 7921, measured as in Example C.

EXAMPLE J

An acrylic polyol comprising 20 percent by weight hydroxybutyl acrylate was prepared as described below:

| Charge | Ingredients | Parts by weight |
|---|---|---|
| #1 | Aromatic 100 | 495.00 |
| | Dowanol PM | 67.15 |
| #2 | di-t-amyl peroxide | 30.00 |
| | Aromatic 100 | 270.00 |
| | Dowanol PM | 30.00 |
| #3 | butyl methacrylate | 622.25 |
| | Isobornyl methacrylate | 690.00 |
| | 4-hydroxybutyl acrylate | 374.75 |
| | butyl acrylate | 369.25 |
| #4 | butyl methacrylate | 219.25 |
| | 4-hydroxybutyl acrylate | 125.25 |
| | butyl acrylate | 99.25 |
| | Aromatic 100 | 58.79 |
| #5 | di-t-amyl peroxide | 25.00 |
| | Aromatic 100 | 16.93 |
| #6 | di-t-amyl peroxide | 25.00 |
| | Aromatic 100 | 16.88 |
| #7 | Aromatic 100 | 437.93 |

Charge 1 was added to a round bottom flask equipped with a stirrer, condenser, temperature control system, and two feeding lines under inert gas. The reaction mixture was heated to 150° C. with stirring. Charge 2 was mixed together and added into the reactor over 240 minutes. After 5 minutes, charge 3 was added into the reactor over 180 minutes. When addition of charge 3 was completed, charge 4 was added into the reaction mixture over 45 minutes. At the end of both additions, the reaction mixture was stirred an additional one hour at reflux. An additional spike (charge 5) of initiator was added to the reaction mixture over 30 minutes and stirring was continued for 1 hour at reflux. Another additional spike (charge 6) of initiator was added to the reaction mixture over 30 minutes and stirring was continued for 1 hour at reflux. Charge 7 was added into reaction mixture and the reaction mixture was cooled to 40° C. The solid content was 64.10% and weight average molecular weight was 6240, measured as in Example C.

EXAMPLE K

An acrylic polyol comprising 30 percent by weight hydroxybutyl acrylate was prepared as described below:

TABLE E

| Charge | Ingredients | Parts by weight |
|---|---|---|
| #1 | Aromatic 100 | 495.00 |
| | Dowanol PM | 67.15 |
| #2 | di-t-amyl peroxide | 30.00 |
| | Aromatic 100 | 270.00 |
| | Dowanol PM | 30.00 |
| #3 | butyl methacrylate | 548.25 |
| | Isobornyl methacrylate | 690.00 |
| | 4-hydroxybutyl acrylate | 562.00 |
| | butyl acrylate | 251.00 |
| #4 | butyl methacrylate | 193.25 |
| | 4-hydroxybutyl acrylate | 188.00 |
| | butyl acrylate | 67.50 |
| | Aromatic 100 | 20.93 |
| #5 | di-t-amyl peroxide | 25.00 |
| | Aromatic 100 | 16.93 |
| #6 | di-t-amyl peroxide | 25.00 |
| | Aromatic 100 | 16.88 |
| #7 | Aromatic 100 | 437.93 |

Charge 1 was added to a round bottom flask equipped with a stirrer, condenser, temperature control system, and two feeding lines under inert gas. The reaction mixture was heated to 150° C. with stirring. Charge 2 was mixed together and added into the reactor over 240 minutes. After 5 minutes, charge 3 was added into the reactor over 180 minutes. When addition of charge 3 was completed, charge 4 was added into the reaction mixture over 45 minutes. At the end of both additions, the reaction mixture was stirred an additional one hour at reflux. An additional spike (charge 5) of initiator was added to the reaction mixture over 30 minutes and stirring was continued for 1 hour at reflux. Another additional spike (charge 6) of initiator was added to the reaction mixture over 30 minutes and stirring was continued for 1 hour at reflux. Charge 7 was added into reaction mixture and the reaction mixture was cooled to 40° C. The solids content was 64.77% and weight average molecular weight was 5864, measured as in Example C.

EXAMPLES 1-4

Four (4) clearcoat compositions were prepared from the following mixture of ingredients. Example 1 is an example of the present invention. Example 2 is a control, containing no rheology modifier. Examples 3 and 4 are comparative:

| | Parts by weight of Component | | | |
|---|---|---|---|---|
| | Example 1 | Example 2 (control) | Example 3 (Comparative) | Example 4 (Comparative) |
| Components | | | | |
| Methyl N-amyl ketone | 72.0 | 72.0 | 72.0 | 72.0 |
| Ethyl 3-ethoxy-propanoate | 16.0 | 16.0 | 16.0 | 16.0 |
| Eversorb 328[1] | 11.8 | 11.8 | 11.8 | 11.8 |
| Resimene 757[2] | 122.5 | 122.5 | 122.5 | 122.5 |
| NAD of Example A | 23.5 | 0 | 23.5 | 0 |
| Bisurea of Example B | 113 | 0 | 0 | 113 |
| Acrylic polyol of Example C | 218.4 | 273 | 267.4 | 224.1 |
| Polyester of Example D | 104.2 | 156.4 | 151.5 | 109.7 |
| Disparlon OX-60[3] | 1.4 | 1.4 | 1.4 | 1.4 |
| Eversorb 93[4] | 1.2 | 1.2 | 1.2 | 1.2 |
| Siloxane borate of Example E | 9.2 | 9.2 | 9.2 | 9.2 |
| Dodecylbenzylsulfonic acid solution | 14.5 | 14.5 | 14.5 | 14.5 |
| Reduction | | | | |
| Methyl N-amyl ketone | 12.0 | 0 | 8.0 | 34 |
| TOTAL | 719.8 | 682.6 | 703.6 | 729.6 |

[1]UV absorbers commercially available from Everlight Chemical Taiwan. [2]Melamine curing agent commercially available from INEOS Melamines. [3]Additives available from Kusumoto Chemicals.
[4]Hindered amine light stabilizer available from Everlight Chemical Taiwan.

A solventborne primer commercially available from PPG as FCP6534R was spray applied in an environment controlled to 70-75° F. (21-24° C.) and 50-60% relative humidity onto 4 inch by 12 inch (10 cm by 30 cm) steel panels that were coated with PPG Electrocoat (ED 6280Z) commercially available from PPG Industries, Inc. The substrate panels were obtained from ACT Test Panels, LLC of Hillsdale, Mich. The primer was applied in one coat, and then flashed at ambient temperature for 5 minutes and then baked for 30 minutes at 325° F. (163° C.). The film thickness was approximately 1.2 mils (30 microns). A solventborne basecoat commercially available from PPG as MCT7226RL was spray applied in an environment controlled to 70-75° F. (21-24° C.) and 60-70% relative humidity. The basecoat was applied in two coats with a 1.5 minute flash between coats, and then flashed at ambient temperature for 4.5 minutes. The film thickness was approximately 0.7 mils (18 microns). Each clearcoat was spray applied over the basecoated panels in two coats with a 1.5 minute flash between coats. The clearcoated panels were allowed to flash for 8 minutes at ambient conditions, then baked for 30 minutes at 285° F. (140° C.). The film thickness was approximately 2.0 mils (50 microns).

Appearance and physical properties were measured on the coated panels. Lower BYK Wavescan values are more desirable for appearance.

| Vertical Panels - Appearance and Physical Properties | | | | | | | | |
|---|---|---|---|---|---|---|---|---|
| | BYK Wavescan[13] | | | | | | Spray | |
| Example | du | Wb | Wc | Wd | Long Wave | Short Wave | viscosity[14] (sec) | Sag[15] (mm) |
| 1 | 32.7 | 24.1 | 19.6 | 12.8 | 7.3 | 22.4 | 28 | 2 |
| 2 | 32.9 | 35.9 | 36.5 | 20.4 | 18.5 | 43.1 | 28 | 14 |
| 3 | 32.8 | 26.1 | 23.1 | 15.6 | 11.6 | 28.3 | 28 | 9 |
| 4 | 37.1 | 35.3 | 31.6 | 17.9 | 14.8 | 36.8 | 27 | 6 |

[13]BYK Wavescan instrument manufactured by BYK Gardner USA of Columbia, Maryland.
[14]Viscosity measured in seconds with a #4 FORD efflux cup at ambient temperature.
[15]Sag measured from a hole in the substrate.

EXAMPLES 5-6

Two (2) clearcoat compositions were prepared in accordance with the present invention from the following mixture of ingredients:

| | Example 5 | Example 6 |
|---|---|---|
| Components | | |
| Methyl N-amyl ketone | 900.0 | 900.0 |
| Ethyl 3-ethoxypropanoate | 200.0 | 200.0 |
| Eversorb 328 | 148.0 | 148.0 |
| Resimene 757 | 1530.6 | 1530.6 |
| NAD of Example A | 293.3 | 293.3 |
| Bisurea of Example B | 1413.2 | 1413.2 |
| Acrylic polyol of Example C | 2731.8 | 2111.1 |
| Lactide-modified Acrylic Polymer of Example F | | 921.8 |
| Polyester of Example D | 1303.0 | 947.0 |
| Disparlon OX-60 | 18.0 | 18.0 |
| Eversorb 93 | 15.0 | 15.0 |
| Siloxane borate of Example E | 115.0 | 115.0 |
| Byk-415[1] | 1.7 | 1.7 |
| Dodecylbenzylsulfonic acid solution | 181.7 | 181.7 |
| Reduction | | |
| Methyl N-amyl ketone | 120.0 | 135 |
| TOTAL | 8971.3 | 8931.4 |

[1]additive commercially available from Byk (Altana Group).

A solventborne primer commercially available from PPG as FCP6534R was spray applied in an environment controlled to 70-75° F. (21-24° C.) and 50-60% relative humidity onto 4 inch by 12 inch (10 cm by 30 cm) steel panels that were coated with PPG Electrocoat (ED 6280Z) commercially available from PPG. The substrate panels were obtained from ACT Test Panels, LLC of Hillsdale, Mich. The primer was applied in one coat, and then flashed at ambient temperature for 5 minutes and then baked for 30 minutes at 325° F. (163° C.). The film thickness was approximately 1.2 mils (30 microns). A solventborne basecoat commercially available from PPG as MCT7226RL was spray applied in an environment controlled to 70-75° F. (21-24° C.) and 60-70% relative humidity. The basecoat was applied in two coats with a 1.5 minute flash between coats, and then flashed at ambient temperature for 3.5 minutes. The film thickness was approximately 0.7 mils (18 microns). Each clearcoat was spray applied over the basecoated panels in two coats with a 1.5 minute flash between coats. The clearcoated panels were allowed to flash for 6.5 minutes at ambient conditions, then baked for 7 minutes at 200° F. (93° C.) followed by a bake for 23 minutes 285° F. The film thickness was approximately 2.0 mils (50 microns).

Appearance and physical properties were measured on the coated panels. Lower BYK Wavescan values are more desirable for appearance.

| Vertical Panels - Appearance and Physical Properties | | | | | | | |
|---|---|---|---|---|---|---|---|
| | BYK Wavescan[13] | | | | | | Spray |
| Example | du | Wb | Wc | Wd | Long Wave | Short Wave | viscosity[14] (sec) |
| TMAC9000FR[15] | 23.7 | 27.4 | 22.8 | 23.2 | 12.2 | 21.4 | 28 |
| 5 | 22.4 | 28.5 | 18.8 | 19.3 | 9.3 | 23.0 | 28 |
| 6 | 21.9 | 29.2 | 17.6 | 16.5 | 7.9 | 23.6 | 27 |

[13]BYK Wavescan instrument manufactured by BYK Gardner USA of Columbia, Maryland.
[14]Viscosity measured in seconds with a #4 FORD efflux cup at ambient temperature.
[15]Solventborne clearcoat commercially available from PPG Industries, Inc. as TMAC9000FR, used as a control.

EXAMPLES 7-10

Four (4) clearcoat compositions were prepared from the following mixture of ingredients. Examples 7 and 8 are comparative, using hydroxyethyl acrylate in the acrylic polyol. Examples 9 and 10 are examples of the present invention, using hydroxybutyl acrylate in the acrylic polyol:

| | Parts by weight of Component | | | |
|---|---|---|---|---|
| | Example 7 (Comparative) | Example 8 (Comparative) | Example 9 | Example 10 |
| Components | | | | |
| Methyl N-amyl ketone | 170.0 | 170.0 | 170.0 | 170.0 |
| Ethyl 3-ethoxy-propanoate | 34.0 | 34.0 | 34.0 | 34.0 |
| Eversorb 76[1] | 12.6 | 12.6 | 12.6 | 12.6 |
| Eversorb 74[1] | 12.6 | 12.6 | 12.6 | 12.6 |
| Resimene 757[2] | 260.2 | 260.2 | 260.2 | 260.2 |
| NAD of Example G | 49.9 | 49.9 | 49.9 | 49.9 |
| Bisurea of Example B | 240.2 | 240.2 | 240.2 | 240.2 |
| Acrylic polyol of Example H | 455.7 | 0 | 0 | 0 |
| Acrylic polyol of Example I | 0 | 452.2 | 0 | 0 |
| Acrylic polyol of Example J | 0 | 0 | 451.6 | 0 |
| Acrylic polyol of Example K | 0 | 0 | 0 | 445.1 |
| Polyester of Example D | 221.5 | 221.5 | 221.5 | 221.5 |
| Disparlon OX-60[3] | 3.1 | 3.1 | 3.1 | 3.1 |
| Eversorb 93[4] | 2.6 | 2.6 | 2.6 | 2.6 |
| Siloxane borate of Example E | 19.6 | 19.6 | 19.6 | 19.6 |
| Byk-415[5] | 0.3 | 0.3 | 0.3 | 0.3 |
| Acid Catalyst[6] Reduction | 8.5 | 8.5 | 8.5 | 8.5 |
| Methyl N-amyl ketone | 12.0 | 45.0 | 0.0 | 17.5 |
| TOTAL | 1502.8 | 1532.3 | 1486.7 | 1497.7 |

[1]UV absorbers commercially available from Everlight Chemical Taiwan.
[2]Melamine curing agent commercially available from INEOS Melamines.
[3]Additives available from Kusumoto Chemicals.
[4]Hindered amine light stabilizer available from Everlight Chemical Taiwan.
[5]Additive available from Byk Additives.
[6]Dodecylbenzylsulfonic acid solution available from Allnex.

Coatings were applied to steel panels that were coated with PPG Electrocoat (ED 6060C) and PPG Primer (HP78224EH) commercially available from PPG. Substrate panels were obtained from ACT Test Panels, LLC of Hillsdale, Mich. A solventborne basecoat commercially available from PPG as DCT7211RL was spray applied in an environment controlled to 70-75° F. (21-24° C.) and 60-70% relative humidity. The basecoat was applied in two coats with a 1.5 minute flash between coats, and then flashed at ambient temperature for 4.5 minutes. The film thickness was approximately 0.7 mils (18 microns). Each clearcoat was spray applied over the basecoated panels in two coats with a 1.5 minute flash between coats. The clearcoated panels were allowed to flash for 8 minutes at ambient conditions, then baked for 30 minutes at 285° F. (140° C.). The film thickness was approximately 2.0 mils (50 microns).

Appearance and physical properties were measured on the coated panels. Lower BYK Wavescan values and higher DOI values are more desirable for appearance.

| Vertical Panels - Appearance and Physical Properties | | | | | | | | |
|---|---|---|---|---|---|---|---|---|
| | BYK Wavescan[13] | | | | | | | Spray |
| Example | du | Wb | Wc | Wd | DOI | Long Wave | Short Wave | viscosity[14] (sec) |
| 7 | 5.3 | 39.7 | 26.9 | 22.4 | 87.6 | 13.6 | 36.8 | 35 |
| 8 | 5.4 | 45.0 | 23.3 | 23.5 | 86.1 | 12.2 | 37.3 | 35 |
| 9 | 2.3 | 30.6 | 22.4 | 21.4 | 91.2 | 12.2 | 28.1 | 35 |
| 10 | 3.0 | 36.6 | 22.4 | 21.4 | 89.3 | 11.9 | 32.7 | 35 |

[13]BYK Wavescan instrument manufactured by BYK Gardner USA of Columbia, Maryland.
[14]Viscosity measured in seconds with a #4 FORD efflux cup at ambient temperature.

Whereas particular examples of this invention have been described above for purposes of illustration, it will be evident to those skilled in the art that numerous variations of the details of the present invention may be made without departing from the scope of the invention as defined in the appended claims.

We claim:
1. A curable film-forming composition comprising:
 (a) an acrylic polyol prepared from a monomer mixture comprising a hydroxyl functional monomer, wherein the hydroxyl functional monomer comprises a hydroxyalkyl group with an alkyl chain of at least four carbon atoms and wherein the acrylic polyol demonstrates a glass transition temperature less than 15° C.;
 (b) a rheology modifier comprising:
  (1) a non-aqueous dispersion of an internally cross-linked organic polymer; and
  (2) a reaction product of an amine and an isocyanate; and
 (c) a curing agent comprising functional groups that are reactive with hydroxyl functional group; wherein the reaction product (2) is dispersed in a second acrylic polyol prepared from a monomer mixture comprising:
  (i) a beta-hydroxy ester functional monomer prepared from an ethylenically unsaturated acid functional monomer and an epoxy compound containing at least 5 carbon atoms;
  (ii) hydroxyethyl methacrylate;
  (iii) styrene;
  (iv) 2-ethylhexyl acrylate.

2. The curable film-forming composition of claim 1, wherein the acrylic polyol demonstrates a weight average molecular weight of 3000 to 10,000.

3. The curable film-forming composition of claim 1, wherein the hydroxyl functional monomer comprising a hydroxyalkyl group with an alkyl chain of at least four carbon atoms is present in the monomer mixture in an amount of 5 to 25 percent by weight, based on the total weight of monomers in the monomer mixture.

4. The curable film-forming composition of claim 1, wherein the internally crosslinked organic polymer is prepared from a monomer mixture comprising:
(i) methyl methacrylate;
(ii) butyl acrylate;
(iii) styrene; and
(iv) ethylene glycol dimethacrylate.

5. The curable film-forming composition of claim 1, wherein the reaction product (2) comprises hexamethylene diisocyanate at least partially capped with benzylamine.

6. The curable film-forming composition of claim 1, wherein the curing agent (c) comprises an aminoplast that is at least 80% alkylated.

7. The curable film-forming composition according to claim 1, wherein at least a portion of the acrylic polyol (a) is further reacted with a lactide prior to incorporation into the curable film-forming composition.

8. The curable film-forming composition of claim 1, further comprising a carbamate functional polyester polyol.

9. The curable film-forming composition according to claim 8, wherein the polyester polyol is prepared from a reaction mixture comprising:
(i) hexahydrophthalic anhydride;
(ii) 2-ethyl-2-hydroxymethyl-1,3-propanediol;
(iii) trimethylpentanediol; and
(iv) dimethylpropanediol.

10. The curable film-forming composition of claim 1, wherein the composition has a solids content of at least 52 percent by weight, based on the total weight of resin solids in the curable film-forming composition.

11. A multi-component composite coating comprising a first film-forming composition applied to a substrate to form a colored base coat layer, and a second transparent film-forming composition applied on top of the base coat to form a clearcoat layer, wherein the transparent film-forming composition comprises the curable film-forming composition of claim 1.

12. The multi-component composite coating according to claim 11, further comprising a primer composition applied to the substrate prior to application of the first film-forming composition.

13. A method for forming a composite coating on a substrate comprising:
(A) applying a first film-forming composition to a substrate to form a colored base coat layer; and
(B) applying a second, transparent film-forming composition to at least a portion of the colored base coat layer formed in step (A) prior to substantially curing the colored base coat, to form a clearcoat layer thereon, wherein the transparent film-forming composition comprises the curable film-forming composition of claim 1.

14. The method according to claim 13, further comprising a step of forming a primer coating upon the surface of the substrate prior to applying the first coating composition of step (A), wherein the first coating composition is applied directly onto the primer coating.

15. The method according to claim 14, wherein the primer coating is cured prior to applying the first coating composition of step (A).

16. The method according to claim 14, further comprising: (C) holding the substrate at a temperature and for a time sufficient to substantially cure the multi-component composite coating after all coating compositions have been applied to the substrate.

* * * * *